US007676538B2

(12) United States Patent
Potter et al.

(10) Patent No.: US 7,676,538 B2
(45) Date of Patent: *Mar. 9, 2010

(54) SYSTEMS AND METHODS FOR APPLICATION VIEW TRANSACTIONS

(75) Inventors: Timothy Potter, Denver, CO (US); Mitch Upton, Highlands Ranch, CO (US); Christa Golding, Littleton, CO (US); Rick DeGrande, Littleton, CO (US)

(73) Assignee: BEA Systems, Inc., Redwood Shores, CA (US)

( * ) Notice: Subject to any disclaimer, the term of this patent is extended or adjusted under 35 U.S.C. 154(b) by 1060 days.

This patent is subject to a terminal disclaimer.

(21) Appl. No.: 10/402,825

(22) Filed: Mar. 28, 2003

(65) Prior Publication Data
US 2004/0019684 A1 Jan. 29, 2004

Related U.S. Application Data

(60) Provisional application No. 60/377,322, filed on May 2, 2002.

(51) Int. Cl.
G06F 15/16 (2006.01)
G06F 17/30 (2006.01)
G06F 7/00 (2006.01)

(52) U.S. Cl. ............................ 709/200; 707/2; 707/102
(58) Field of Classification Search ......... 709/227–229; 718/101
See application file for complete search history.

(56) References Cited

U.S. PATENT DOCUMENTS 5,321,841 A  6/1994  East et al. .................. 395/725
5,469,562 A  11/1995  Saether
5,604,860 A  2/1997  McLaughlin et al.
5,630,131 A  5/1997  Palevich et al.
5,748,975 A  5/1998  Van De Vanter ............ 395/793
5,801,958 A  9/1998  Dangelo et al.

(Continued)

FOREIGN PATENT DOCUMENTS

CA  2248634  3/2000

(Continued)

OTHER PUBLICATIONS

Kunisetty, "Workflow Modeling and Simulation Using an Extensible Object-Oriented Knowledge Base Management System" CiteSeer, 1996, pp. 1-60.

(Continued)

Primary Examiner—William C Vaughn, Jr.
Assistant Examiner—Joiya M Cloud
(74) Attorney, Agent, or Firm—Fliesler Meyer LLP

(57) ABSTRACT

Local transactions are supported by an application view instance that can switch from a stateless session bean to a stateful session bean in order to open a connection for a local transaction. The state that the stateful session bean holds is ten the connection. The stateful session bean can hold the connection open across multiple requests in the local transaction interface allows a user to manage the transaction in the application view, and to switch the application view between a stateless session bean and a stateful session bean. A local transaction interface can contain a local transaction management contract, which enables an application server to provide an infrastructure and run-time environment for management of the transaction.

22 Claims, 2 Drawing Sheets

U.S. PATENT DOCUMENTS

| | | | |
|---|---|---|---|
| 5,835,769 A | 11/1998 | Jervis et al. | 395/701 |
| 5,836,014 A | 11/1998 | Faiman, Jr. | 395/707 |
| 5,862,327 A | 1/1999 | Kwang et al. | |
| 5,867,822 A | 2/1999 | Sankar | |
| 5,933,838 A | 8/1999 | Lomet | 707/202 |
| 5,944,794 A | 8/1999 | Okamoto et al. | |
| 5,950,010 A | 9/1999 | Hesse et al. | 395/712 |
| 5,961,593 A | 10/1999 | Gabber et al. | 709/219 |
| 5,966,535 A | 10/1999 | Bendikt et al. | |
| 6,012,083 A | 1/2000 | Savitzky et al. | |
| 6,016,495 A | 1/2000 | McKeehan et al. | |
| 6,018,730 A | 1/2000 | Nichols et al. | |
| 6,023,578 A | 2/2000 | Birsan et al. | |
| 6,023,722 A | 2/2000 | Colyer | |
| 6,028,997 A | 2/2000 | Leymann et al. | 395/701 |
| 6,029,000 A | 2/2000 | Woolsey et al. | |
| 6,044,217 A | 3/2000 | Brealey et al. | 395/701 |
| 6,067,548 A | 5/2000 | Cheng | 707/103 |
| 6,067,623 A | 5/2000 | Blakley, III et al. | 713/201 |
| 6,070,184 A | 5/2000 | Blount et al. | |
| 6,085,030 A | 7/2000 | Whitehead et al. | 395/200.33 |
| 6,092,102 A | 7/2000 | Wagner | |
| 6,119,149 A | 9/2000 | Notani | 709/205 |
| 6,141,686 A | 10/2000 | Jackowski et al. | |
| 6,141,701 A | 10/2000 | Whitney | |
| 6,148,336 A | 11/2000 | Thomas et al. | |
| 6,185,734 B1 | 2/2001 | Saboff et al. | |
| 6,212,546 B1 | 4/2001 | Starkovich et al. | |
| 6,222,533 B1 | 4/2001 | Notani et al. | |
| 6,226,675 B1 | 5/2001 | Meltzer et al. | 709/223 |
| 6,230,287 B1 | 5/2001 | Pinard et al. | 714/31 |
| 6,230,309 B1 | 5/2001 | Turner et al. | |
| 6,237,135 B1 | 5/2001 | Timbol | 717/717 |
| 6,243,737 B1 * | 6/2001 | Flanagan et al. | 709/202 |
| 6,256,676 B1 | 7/2001 | Taylor et al. | |
| 6,282,561 B1 | 8/2001 | Jones et al. | |
| 6,282,711 B1 | 8/2001 | Halpern et al. | 717/709 |
| 6,292,932 B1 | 9/2001 | Baisley et al. | |
| 6,311,327 B1 | 10/2001 | O'Brien et al. | |
| 6,324,681 B1 | 11/2001 | Sebesta et al. | |
| 6,330,569 B1 | 12/2001 | Baisley et al. | |
| 6,334,114 B1 | 12/2001 | Jacobs et al. | |
| 6,336,122 B1 | 1/2002 | Lee et al. | 707/204 |
| 6,338,064 B1 | 1/2002 | Ault et al. | 707/9 |
| 6,343,265 B1 | 1/2002 | Glebov et al. | |
| 6,349,408 B1 | 2/2002 | Smith | 717/11 |
| 6,353,923 B1 | 3/2002 | Bogle et al. | 717/4 |
| 6,360,358 B1 | 3/2002 | Elsbree et al. | |
| 6,367,068 B1 | 4/2002 | Vaidyanathan et al. | |
| 6,377,939 B1 | 4/2002 | Young | |
| 6,393,605 B1 | 5/2002 | Loomans | 717/121 |
| 6,408,311 B1 | 6/2002 | Baisley et al. | |
| 6,411,698 B1 | 6/2002 | Bauer et al. | |
| 6,445,711 B1 | 9/2002 | Scheel et al. | |
| 6,463,503 B1 | 10/2002 | Jones et al. | 711/114 |
| 6,470,364 B1 | 10/2002 | Prinzing | |
| 6,516,322 B1 | 2/2003 | Meredith | |
| 6,549,949 B1 | 4/2003 | Bowman-Amuah | 709/236 |
| 6,560,636 B2 | 5/2003 | Cohen et al. | |
| 6,560,769 B1 | 5/2003 | Moore et al. | |
| 6,567,738 B2 | 5/2003 | Gopp et al. | |
| 6,584,454 B1 | 6/2003 | Hummel et al. | |
| 6,594,693 B1 | 7/2003 | Borwankar | 709/219 |
| 6,594,700 B1 | 7/2003 | Graham et al. | |
| 6,601,113 B1 | 7/2003 | Koistinen et al. | |
| 6,604,198 B1 | 8/2003 | Beckman et al. | 713/167 |
| 6,609,115 B1 | 8/2003 | Mehring et al. | |
| 6,615,258 B1 | 9/2003 | Barry et al. | |
| 6,636,491 B1 | 10/2003 | Kari et al. | |
| 6,637,020 B1 | 10/2003 | Hammond | |
| 6,643,652 B2 * | 11/2003 | Helgeson et al. | 707/10 |
| 6,654,932 B1 | 11/2003 | Bahrs et al. | |
| 6,662,357 B1 | 12/2003 | Bowman-Amuah | |
| 6,678,518 B2 | 1/2004 | Eerola | |
| 6,684,388 B1 | 1/2004 | Gupta et al. | |
| 6,687,702 B2 | 2/2004 | Vaitheeswaran et al. | |
| 6,687,848 B1 | 2/2004 | Najmi | |
| 6,721,740 B1 | 4/2004 | Skinner et al. | |
| 6,721,779 B1 | 4/2004 | Maffeis | |
| 6,732,237 B1 | 5/2004 | Jacobs et al. | 711/119 |
| 6,748,420 B1 | 6/2004 | Quatrano et al. | |
| 6,754,884 B1 | 6/2004 | Lucas et al. | |
| 6,757,689 B2 | 6/2004 | Battas et al. | |
| 6,789,054 B1 | 9/2004 | Makhlouf | |
| 6,795,967 B1 | 9/2004 | Evans et al. | 719/310 |
| 6,799,718 B2 | 10/2004 | Chan et al. | |
| 6,802,000 B1 | 10/2004 | Greene et al. | 713/168 |
| 6,804,686 B1 | 10/2004 | Stone et al. | 707/104.1 |
| 6,823,495 B1 | 11/2004 | Vedula et al. | |
| 6,832,238 B1 * | 12/2004 | Sharma et al. | 709/201 |
| 6,836,883 B1 | 12/2004 | Abrams et al. | |
| 6,847,981 B2 | 1/2005 | Song et al. | |
| 6,850,979 B1 | 2/2005 | Saulpaugh et al. | |
| 6,859,180 B1 | 2/2005 | Rivera | |
| 6,874,143 B1 | 3/2005 | Murray et al. | |
| 6,889,244 B1 | 5/2005 | Gaither et al. | |
| 6,915,519 B2 | 7/2005 | Williamson et al. | |
| 6,918,084 B1 | 7/2005 | Slaughter et al. | |
| 6,922,827 B2 | 7/2005 | Vasilik et al. | |
| 6,950,872 B2 | 9/2005 | Todd, II | |
| 6,959,307 B2 | 10/2005 | Apte | |
| 6,963,914 B1 | 11/2005 | Breitbart et al. | |
| 6,971,096 B1 | 11/2005 | Ankireddipally et al. | |
| 6,976,061 B1 * | 12/2005 | Sharma | 709/220 |
| 6,976,086 B2 | 12/2005 | Sadeghi et al. | |
| 7,000,219 B2 | 2/2006 | Barrett et al. | |
| 7,017,146 B2 | 3/2006 | Dellarocas et al. | |
| 7,043,722 B2 | 5/2006 | Bau, III | |
| 7,051,072 B2 | 5/2006 | Stewart et al. | |
| 7,051,316 B2 | 5/2006 | Charisius et al. | |
| 7,054,858 B2 | 5/2006 | Sutherland | |
| 7,062,718 B2 | 6/2006 | Kodosky et al. | |
| 7,069,507 B1 | 6/2006 | Alcazar et al. | |
| 7,072,934 B2 * | 7/2006 | Helgeson et al. | 709/203 |
| 7,073,167 B2 | 7/2006 | Iwashita | |
| 7,076,772 B2 | 7/2006 | Zatloukal | |
| 7,089,568 B2 | 8/2006 | Yoshida | |
| 7,089,584 B1 | 8/2006 | Sharma | |
| 7,096,422 B2 | 8/2006 | Rothschiller et al. | |
| 7,107,578 B1 | 9/2006 | Alpern | |
| 7,111,243 B1 | 9/2006 | Ballard et al. | |
| 7,117,504 B2 | 10/2006 | Smith et al. | |
| 7,127,704 B2 | 10/2006 | Van De Vanter et al. | |
| 7,143,186 B2 | 11/2006 | Stewart et al. | |
| 7,146,422 B1 | 12/2006 | Marlatt et al. | |
| 7,155,705 B1 | 12/2006 | Hershberg et al. | |
| 7,165,041 B1 | 1/2007 | Guheen et al. | |
| 7,181,731 B2 | 2/2007 | Pace et al. | |
| 7,184,967 B1 | 2/2007 | Mital et al. | |
| 7,240,331 B2 | 7/2007 | Vion-Dury et al. | |
| 7,260,599 B2 | 8/2007 | Bauch et al. | |
| 7,260,818 B1 | 8/2007 | Iterum et al. | |
| 2002/0004848 A1 | 1/2002 | Sudarshan et al. | |
| 2002/0010781 A1 | 1/2002 | Tuatini | |
| 2002/0010803 A1 | 1/2002 | Oberstein et al. | |
| 2002/0016759 A1 | 2/2002 | Macready et al. | |
| 2002/0049788 A1 | 4/2002 | Lipkin et al. | |
| 2002/0073080 A1 | 6/2002 | Lipkin | |
| 2002/0073236 A1 * | 6/2002 | Helgeson et al. | 709/246 |
| 2002/0073396 A1 | 6/2002 | Crupi et al. | |
| 2002/0078255 A1 * | 6/2002 | Narayan | 709/316 |
| 2002/0083075 A1 | 6/2002 | Brummel et al. | |
| 2002/0111922 A1 | 8/2002 | Young et al. | |
| 2002/0116454 A1 | 8/2002 | Dyla et al. | |

| | | |
|---|---|---|
| 2002/0120685 A1 | 8/2002 | Srivastava et al. |
| 2002/0138556 A1* | 9/2002 | Smithline et al. ........... 709/203 |
| 2002/0143960 A1 | 10/2002 | Goren et al. |
| 2002/0152106 A1 | 10/2002 | Stoxen et al. |
| 2002/0161826 A1 | 10/2002 | Arteaga et al. |
| 2002/0165936 A1 | 11/2002 | Alston et al. |
| 2002/0169644 A1 | 11/2002 | Greene |
| 2002/0174178 A1 | 11/2002 | Stawikowski |
| 2002/0174241 A1 | 11/2002 | Beged-Dov et al. |
| 2002/0184610 A1 | 12/2002 | Chong et al. |
| 2002/0188486 A1 | 12/2002 | Gil et al. |
| 2002/0194244 A1 | 12/2002 | Raventos |
| 2002/0194267 A1 | 12/2002 | Flesner et al. |
| 2002/0194495 A1 | 12/2002 | Gladstone et al. |
| 2003/0004746 A1 | 1/2003 | Kheirolomoom et al. |
| 2003/0005181 A1 | 1/2003 | Bau, III et al. |
| 2003/0014439 A1 | 1/2003 | Boughannam |
| 2003/0014526 A1* | 1/2003 | Pullara et al. ............... 709/227 |
| 2003/0018661 A1 | 1/2003 | Darugar |
| 2003/0018665 A1 | 1/2003 | Dovin et al. |
| 2003/0018832 A1 | 1/2003 | Amirisetty et al. |
| 2003/0018963 A1 | 1/2003 | Ashworth et al. |
| 2003/0023957 A1 | 1/2003 | Bau et al. |
| 2003/0028579 A1 | 2/2003 | Kulkarni et al. |
| 2003/0043191 A1 | 3/2003 | Tinsley et al. |
| 2003/0046266 A1 | 3/2003 | Mullins et al. |
| 2003/0046591 A1 | 3/2003 | Asghari-Kamrani et al. |
| 2003/0051066 A1 | 3/2003 | Pace et al. |
| 2003/0055868 A1 | 3/2003 | Fletcher et al. |
| 2003/0055878 A1 | 3/2003 | Fletcher et al. |
| 2003/0074217 A1 | 4/2003 | Beisiegel et al. |
| 2003/0079029 A1 | 4/2003 | Garimella et al. |
| 2003/0093575 A1 | 5/2003 | Upton |
| 2003/0110117 A1 | 6/2003 | Saidenbereg et al. |
| 2003/0110446 A1 | 6/2003 | Nemer |
| 2003/0126136 A1 | 7/2003 | Omoigui |
| 2003/0135850 A1* | 7/2003 | Miloushev et al. .......... 717/165 |
| 2003/0149791 A1 | 8/2003 | Kane et al. |
| 2003/0167358 A1 | 9/2003 | Marvin et al. |
| 2003/0196168 A1 | 10/2003 | Hu |
| 2003/0212987 A1* | 11/2003 | Demuth et al. .............. 717/130 |
| 2003/0233631 A1 | 12/2003 | Curry et al. |
| 2004/0019645 A1 | 1/2004 | Goodman et al. |
| 2004/0040011 A1 | 2/2004 | Bosworth et al. |
| 2004/0068568 A1 | 4/2004 | Griffin et al. |
| 2004/0078373 A1 | 4/2004 | Ghoneimy et al. |
| 2004/0103406 A1 | 5/2004 | Patel |
| 2004/0133660 A1 | 7/2004 | Junghuber et al. |
| 2004/0148336 A1 | 7/2004 | Hubbard et al. |
| 2004/0204976 A1 | 10/2004 | Oyama et al. |
| 2004/0216086 A1 | 10/2004 | Bau |
| 2004/0225995 A1 | 11/2004 | Marvin et al. |
| 2004/0260715 A1 | 12/2004 | Mongeon |
| 2005/0050068 A1 | 3/2005 | Vaschillo et al. |
| 2005/0278585 A1 | 12/2005 | Spencer |
| 2006/0059107 A1* | 3/2006 | Elmore et al. ................. 705/64 |
| 2006/0206856 A1 | 9/2006 | Breeden et al. |
| 2006/0234678 A1 | 10/2006 | Juitt et al. |
| 2007/0038500 A1 | 2/2007 | Hammitt et al. |

FOREIGN PATENT DOCUMENTS

| | | |
|---|---|---|
| WO | WO 0029924 | 5/2000 |
| WO | WO 01/90884 A2 | 11/2001 |

OTHER PUBLICATIONS

Van Der Aalst et al., "Verification of XRL: An XML-Based Workflow Language" IEEE, Jul. 2001, pp. 427-432.
Blake, "Rule-Driven Coordination Agents: A Self-Configurable Agent Architecture for Distributed Control" IEEE, Mar. 2001; pp. 271-277.
Dahalin et al., "Workflow Interoperability Using Extensible Markup Language (XML)" IEEE, Jul. 2002; pp. 513-516.
Blake; Rule-Driven Coordination Agents: "A Self-Configurable Agent Architecture for Distributed Controls" IEEE, Mar. 2001, pp. 271-277.
Dahalin et al., "Workflow Interoperability Using Extensible Markup Language (XML)" , IEEE, Jul. 2002, pp. 513-516.
Kunisetty, Workflow Modeling and Simulation Using and Extensible Object-Oriented Knowledge Based Management System, CiteSeer. 1996 pp. 1-60.
Lauer, Christophe "Introducing Microsoft DotNet" Jul. 2, 2002, pp. 4-5.
Van Der Aalst et al., Verification of XRL: An XML-Based Workflow Language, IEEE, Jul. 2001, pp. 427-432.
Kilgore, "Multi-Language, Open-Source Modeling Using the Microsoft NET Architecture," Proceedings of the 2002 Winter Simulation Conference, Dec. 8-11, 2002, IEEE, Vol. 1, pp. 629-633.
Sosnoski, "XML and Java technologies: Data binding, Part 1: Code generation approaches—JAXB and more," IBM, Jan. 1, 2003, http://www-128.ibm.com/developerworks/library/x-databdopt/index. html, pp. 1-11.
Chen, et al., "eCo Architecture for Electronic Commerce Interoperability," CommerceNet eCo Framework Project, Jun. 29, 1999, CommerceNet, Inc., pp. 1-107.
JAVA Debug Interface—definition, retrieved from <URL http://java.sun.com/j2se/1.4.2/docs/guide/jpda/jdi/overview-summary.html> on Feb. 21, 2007, pp. 1-3.
Embury, et al., "Assisting the Comprehension of Legacy Transactions," Proceedings of the Eighth Working Conference on Reverse Engineering, Oct. 2-5, 2001, pp. 345-354.
Mays, et al., "A Persistent Store for Large Shared Knowledge Bases," IEEE Transactions on Knowledge and Data Engineering, vol. 3, No. 1, Mar. 1991, pp. 33-41.
Tang, et al., "Integrating Remote Invocation and Distributed Shared State," Proceedings of the 18th International Parallel and Distributed Processing Symposium, (IPDPS '04), Apr. 26-30, 2004, 10 pages.
BEA Systems, Inc., "Transforming Data Using Xquery Mapper", BEA AquaLogic Service Bus 2.0 Documentation, 2006, 19 pages.
Stylus Studio, "Xquery Mapper", 2007, 6 pages, Stylus Studios.
Altova, "XML-toXML Mapping", 2007, 3 pages, Altova Map Force.
Jamper, "Jamper-Java XML Mapper", 2007, 4 pages, Sourceforge.
Bogunovic, "A Programming Model for Composing Data Flow Collaborative Applications", Proceedings of the IEEE International Conference on Engineering of Computer Based Systems, Mar. 7-12, 1999, pp. 106-112.
Sung et al. , "A Multimedia Authoring Tool for the Internet", IEEE Transactions on Consumer Electronics, 1997. pp. 304-308.
Smith, et al. "Marching Towards a Software Reuse Future", ACM Ada Letters, Nov./Dec. 1994, pp. 62-72vol. 14, No. 6.
Microsoft, "Microsoft.net Framework", Microsoft Corporation, 2001, 54 pages.
Willink, "Meta-Compilation for C ++", University of Surrey, Jan. 4, 2000, 379 pages.
Supplementary European Search Report for EP 02784131.1 dated Aug. 8, 2007, 4 pages.
Sharma, "J2EE Connector Architecture Specification, Version 1.0 Final Release", Java 2 Enterprise Edition, Aug. 2001, 90 pages, Sun Microsystems.
Allamaraju, et al., "Professional Java Server Programming J2EE 1.3 Edition", Sep. 2001, pp. 1009-1057, WROX.
Mariucci, Marcello; "Enterprise Application Server Development Environment"; Overview: University of Stuttgard. Oct. 10, 2000; p. 1-10.
Sun Microsystems; "IPlante Application Server 6.0 White Paper"; Technical Reference Guide; May 25, 2000.
Roman, Ed and Rochard Oberg. "The Technical Benefits of EJB and J2EE Technologies over COM+ and Windows DNA" Dec. 1999.
Hewlett-Packard; "HP Application Server" technical guide version 8.0. 1999-2001.
C. Mohan et al.; "Aries: A Transaction Recovery Method Supporting Fine-Granularity Locking and Partial Rollbacks Using Write-Ahead Logging"; ACM Transactions on Database Systems, vol. 17, No. 1, Mar. 1992, pp. 94-162.

Liebmann, et al., "Adaptive Data Dissemination and Caching for Edge Service Architectures built with the J2EE", 2004 Symposium on Applied Computing, Nicosia, Cyprus, Mar. 14-17, 2004, ACM Press, pp. 1717-1724.

Alonso et al., "Advanced Transaction Models in Workflow Contexts", IEEE, Feb. 1996, Proceedings of 12th International Conference on Data Engineering, retrieved from: http://citeseer.ist.psu.edualonso96advanced.html., pp. 574-581.

Plaindoux, "XML transducers in Java", May 2002, The Eleventh International World Wide Conference, retrieved from: http://www2002.org/CDROM/poster/132/index.html., 6 pages.

Peltz, "Web Services Orchestration" Hewlett-Packard, Jan. 2003, 20 pages.

Muller, "Event-Oriented Dynamic Adaptation of Workflows: Model, Architecture and Implementation", 2002, 351 pages, University of Leipzig, Germany.

U.S. Appl. No. 10/400,821, filed Mar. 27, 2003, Timothy Potter et al.
U.S. Appl. No. 10/400,822, filed Mar. 27, 2003, Timothy Potter et al.
U.S. Appl. No. 10/402,825, filed Mar. 28, 2003, Timothy Potter et al.

Duvos, Enrique and Azer Bestavros; "An Infrastructure for the Dynamic Distribution of Web Applications and Services"; Department of Computer Science, Boston University. Dec. 2000; pp. 4-12.

* cited by examiner

SYSTEMS AND METHODS FOR APPLICATION VIEW TRANSACTIONS

CLAIM OF PRIORITY

This application claims priority from U.S. provisional patent Application No. 60/377,322 entitled "APPLICATION VIEW TRANSACTIONS", filed May 2, 2002, incorporated herein by reference.

COPYRIGHT NOTICE

A portion of the disclosure of this patent document contains material which is subject to copyright protection. The copyright owner has no objection to the facsimile reproduction by anyone of the patent document of the patent disclosure, as it appears in the Patent and Trademark Office patent file or records, but otherwise reserves all copyright rights whatsoever.

CROSS-REFERENCED CASES

The following applications are cross-referenced and incorporated herein by reference:

U.S. Provisional Application No. 60/377,322 entitled "Shared Common Connection Factory," by Timothy Potter et al., filed May 2, 2002.

U.S. Provisional Application No. 60/377,303 entitled "Adapter Deployment Without Recycle," by Timothy Potter et al., filed May 2, 2002.

U.S. Provisional Application No. 60/377,354 entitled "Modular Deployment of Components," by Timothy Potter et al., filed May 2, 2002.

U.S. patent application Ser. No. 10/271,194 entitled "Application View," by Mitch Upton et al., filed Oct. 15, 2002.

FIELD OF THE INVENTION

The present invention relates to supporting transactions in application integration.

BACKGROUND

In existing application integration (AI) systems, users are unable to capitalize on the full extent of resource adapter functionality. One main area of functionality that is not exploited involves local transaction support. In order to manage a local transaction, a user must acquire a local transaction from a connection object. There is presently no way to do this through an application view component or application view layer. While a Java connector, or at least a Common-Client Interface (CCI)-based Java connector, can support a local transaction, this functionality has not been implemented with regard to an application view layer.

BRIEF SUMMARY

Systems and methods in accordance with embodiments of the present invention can overcome deficiencies in existing integration systems by providing a way to support a local transaction through an application view instance. An application view can switch from a stateless session bean to a stateful session bean in order to open a connection for a local transaction. A state being held by a stateful session bean can be the connection. A stateful session bean can hold a connection open across multiple requests in a local transaction, and can maintain the connection open for the duration of the local transaction.

A local transaction interface can allow a user to manage a local transaction in an application view, and can allow the user to switch the application view between a stateless session bean and a stateful session bean. A Common Client Interface (CCI) class can be used to expose a local transaction interface to a resource adapter client. A transaction manager can be used to obtain a resource for any open connection. The local transaction interface can contain a local transaction management contract, which can enable an application server to provide an infrastructure and run-time environment for management of the transaction.

Other features, aspects, and objects of the invention can be obtained from a review of the specification, the figures, and the claims.

DETAILED DESCRIPTION

Systems and methods in accordance with embodiments of the present invention can enable an application view to support local transactions against a resource adapter. An application view can provide a layer of abstraction between an adapter and Enterprise Information System (EIS) functions exposed by that adapter. Instead of accessing an EIS by direct programming, a user can simply edit the adapter's application views, create new application views, or delete obsolete application views. This layer of abstraction, formed by application views, helps non-programmers easily maintain services and events exposed by the adapter. Each application view can be adapter-specific, and can define a set of business functions on the adapter's EIS. Such application views can provide a view of the application capabilities exposed by an adapter.

Figure 2:
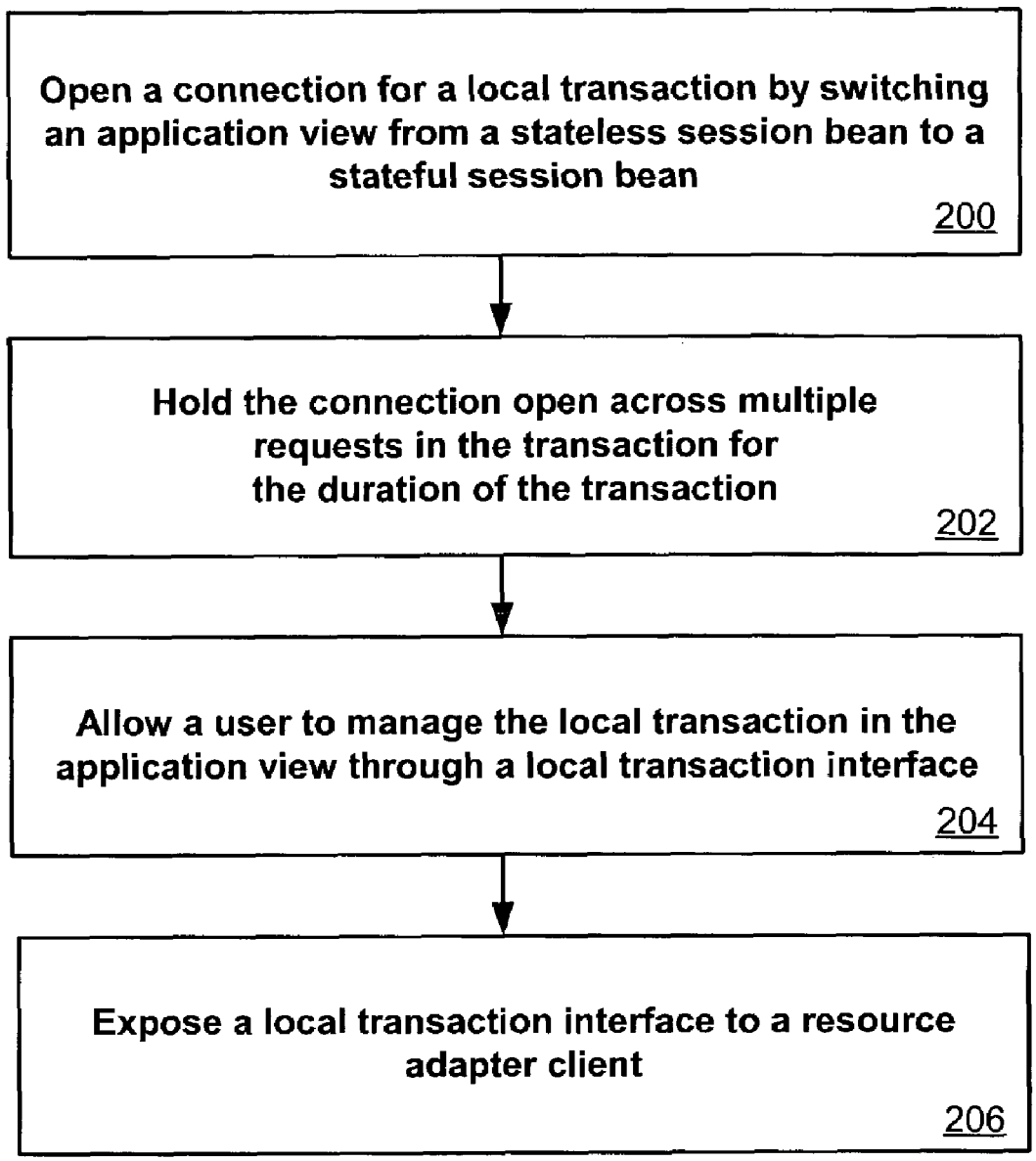
FIG. 2 is a flowchart showing a method that can be used with the system of FIG. 1.

As shown in the exemplary method of FIG. 2, if a client of an application view decides to open a local transaction against an Enterprise Information System (EIS), the application view can switch from a stateless session Enterprise JavaBean (EJB) to a stateful session EJB 200. Since the state that the application view holds is the connection itself, the application view can hold the same local transaction open across multiple service requests 202. A local transaction interface can allow a user to manage a local transaction in an application view 204, and can allow the user to switch the application view between a stateless session bean and a stateful session bean. A Common Client Interface (CCI) class can be used to expose a local transaction interface to a resource adapter client 206.

Figure 1:
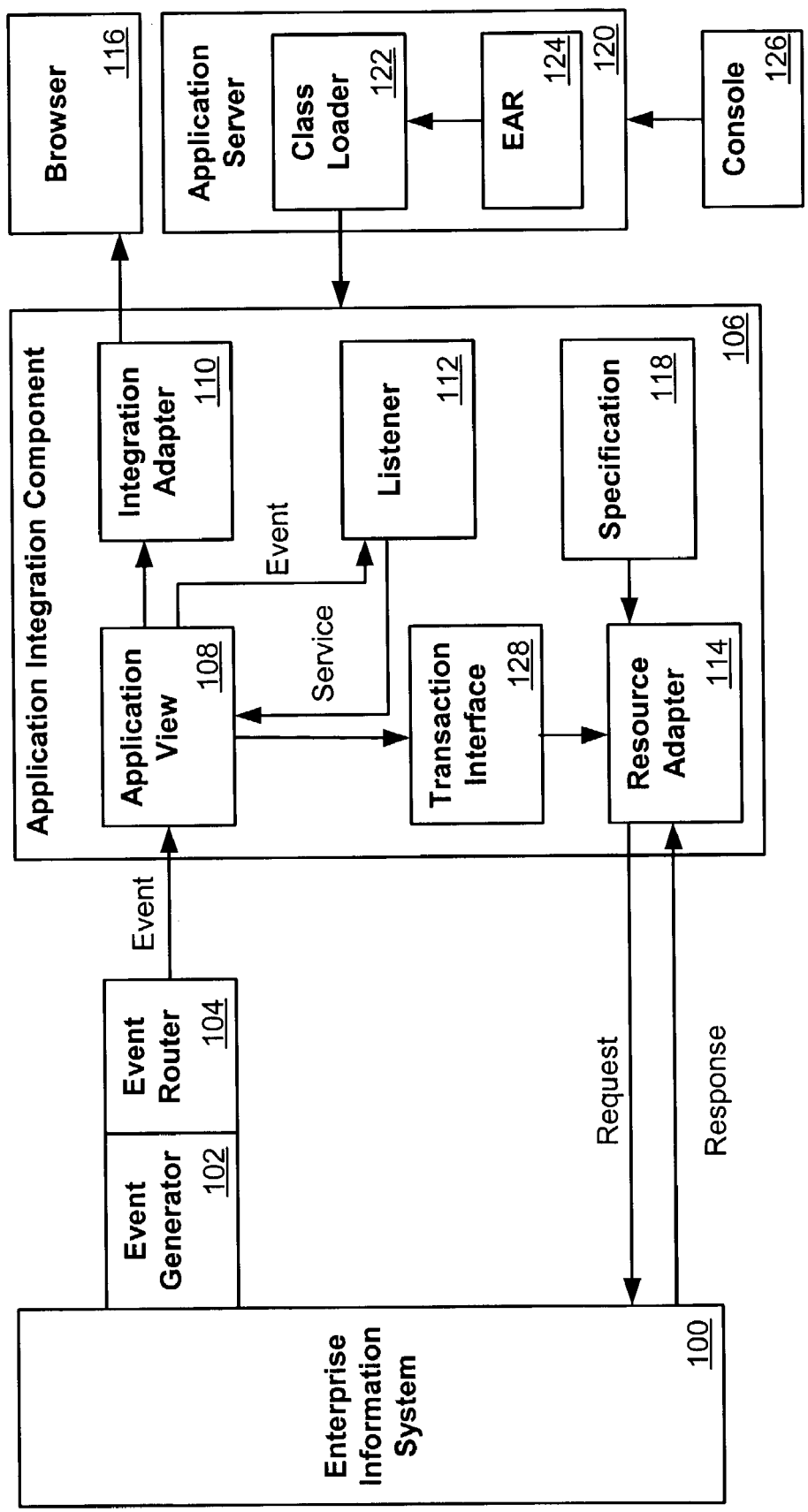
FIG. 1 is a diagram of a system in accordance with one embodiment of the present invention.

An example of one such system is shown in FIG. 1. As shown in the Figure, an integration adapter 110 can allow a user to browse documents or interfaces in an EIS system 100, such as an SAP system, through a Web browser 116. A resource adapter 114 can be used to send requests to, and receive requests from, the EIS 100. The resource adapter 114 can also be used to implement a connector specification 118. An event router 104, which can also be a Web application, can be used to route messages from the EIS 100 to an application view 108 for the application integration component 106.

When an event occurs in the EIS 100, an event generator 102 can detect the event and determine whether anyone should receive this event. To do this, the event generator 102 can check the types of events that have subscriptions, which can be maintained by the event router 104. The event router can create an event object containing pertinent data about the event, and can send the event to the event router 104. The event router 104 can send the event object to an instance of an application view 108 that is subscribed to the type of event object received from the event generator 102. The application view 108 receives the event object and can notify any listener 112 registered for that type of event. Listeners can include integration process flow or custom business logic flow, for example. A listener 112 can process the event object and determine whether a service should be invoked in response to the event.

If a local transaction needs to be opened against the EIS 100, the application view 108 can switch from a stateless session EJB to a stateful session EJB, such that the application view 108 instance can hold the connection with the EIS 100 as state. A transaction interface 128 can manage the transaction for the application view 108. The application view 108 can combine data from the event object with data held by the application view, such as in state variables, and can make a service invocation on a resource adapter 114. The application view can accept the service request and determine which interaction to request on the resource adapter 114. This mapping from service name to adapter interaction can allow the service to be business-centric and not system-function centric. The resource adapter 114 can carry out the request interaction with the EIS 100 and pass the data received from the application view 108. This data can then be viewed, such as through a Web browser 116, through the integration adapter 110.

An integration adapter 110, a resource adapter 114, and an event router 104 are three components that can conform to the J2EE standard. Since these components can be part of the same adapter, they can have many components shared between them. A class loader 122 can be used, such as from an application server 120, which can allow for the use of shared classes at the root of an Enterprise archive (EAR) file 124. An EAR file can be deployed from a server console 126.

Multiple actions against an EIS for a local transaction can be grouped into a logical unit of work. A customer can be unaware of any such grouping. If a customer needs to do local transaction work, the work can be interfaced with a stateful session EJB instead of a stateless session EJB.

A local transaction interface can be exposed to resource adapter clients through a Common Client Interface (CCI) connection class. Presently, the application view interface does not utilize the CCI local transaction interface. By adding the ability to manage a local transaction in the application view, there is no need to use two interfaces to process local transactions.

In order to retain some control over the use of a local transaction interface, the local transaction interface may not be directly exposed. Instead, the functionality of the local transaction can be provided on the application view interface. The application view can provide methods to support the use of local transactions, including methods such as begin( ), commit( ), and rollback( ). In order to provide a client with local transaction functionality, state can be provided in the application view bean. An application view bean can retain a connection for the duration of a single transaction. In order to provide state, the application view bean can be deployed as both a stateful and stateless bean. The client can manage which bean is used, based on calls to the transaction services.

A local transaction management contract can occur whenever an adapter implements a local transaction interface, such as a javax.resource.spi.LocalTransaction interface, to provide support for local transactions performed on the underlying resource manager. These contracts can enable an application server to provide the infrastructure and run-time environment for transaction management. Application components can rely on this transaction infrastructure to support their component-level transaction model.

The methods that are added to the application view interface to support local transactions do not need to be exposed to the user in an application integration (AI) Plug-in. There can be several approaches to supporting application view local transactions within an AI Plug-in.

In one such approach, a connector supports only local transactions with user-defined transaction demarcation. A connector supporting only local transactions can be similar to a TX_REQUIRES_NEW for EJB transactions.

One simple approach, from a user perspective, to supporting application view local transactions is to create a new plug-in action that performs a transaction method for a particular application view instance. In order to use the local transaction plug-in action, additional plug-in actions can be created. Specifically, additional actions can be created that can generate a new application view instance and invoke a service within the local transaction of an application view instance.

Since the demarcation of a local transaction can be represented as separate actions within business process management (BPM), the transaction that is active in BPM may need to be suspended when an application view local transaction 'begin' action is encountered. The BPM transaction can be resumed once a local transaction 'commit' or 'rollback' action is executed. While functionality can be added to the plug-in to reduce the amount of work for a user by catching exceptions between the begin and commit actions, and rolling back the transaction, the begin/suspend and commit/rollback/resume are separate actions in BPM and the potential for problems in user workflows that use application view local transactions increases dramatically. This could result in support problems, mainly due to migration.

In a second scenario, a connector supports only local transactions with transaction demarcation being more transparent and atomic. Such a scenario can be similar to a TX_REQUIRES_NEW for EJB transactions. This scenario can require the development of a base class to perform certain functions. These functions can include suspending a BPM transaction, caching an application view instance for use by user code, and invoking the user's implementation of an abstract method. Other functions can include catching any exceptions from the user's implementation and performing a rollback on the application view instance, then resuming the BPM transaction. On a normal return from the user's implementation, a commit can also be performed on the application view local transaction and the BPM transaction resumed.

In another scenario, a connector supports only local transactions with no user-defined transaction demarcation. Once again, this scenario is similar to a TX_REQUIRES_NEW for EJB transactions because the connector can only support local transactions. In this scenario, the BPM designer does not explicitly demarcate the start and end of a local transaction. The system can allow the connector to participate in the global transaction by providing an XA wrapper around the local transaction object. The XA wrapper can no-opt all methods on the XAResource interface that cannot be delegated to the local transaction instance. The system can allow only one non-XA resource in the transaction chain. A user can then only have one application view local transaction within a workflow.

In another scenario, a connector can support XA transactions. In this case, there may be no support for calling application view services within a local transaction. Each service invocation can automatically be enlisted into the global XA transaction because the resource adapter supports XA.

An XA resource-based contract can occur between a transaction manager and a resource manager in a distributed transaction processing (DTP) environment. An "XAResource" interface can be a Java mapping of an industry standard XA interface. Such an interface can be used with a javax.transaction.xa package, which can provide an API to define the contract between the transaction manager and the resource manager. This contract can allow the transaction manager to enlist and delist resource objects, which can be supplied by the resource manager driver, in Java Transaction API (JTA) transactions. A driver vendor for a specific resource manager can provide the implementation of this API. A JDBC driver or JMS provider can implement this interface to support an association between a global transaction and a database or message service connection. An XAResource interface can be supported by any transactional resource intended for use by application programs. This can be accomplished in an environment where transactions are controlled by an external transaction manager. An example of such an environment includes a database management system where an application accesses data through multiple database connections. Each database connection is enlisted with the transaction manager as a transactional resource. The transaction manager obtains an XAResource for each connection participating in a global transaction. The transaction manager uses a start( ) method to associate the global transaction with the resource. The transaction manager uses an end( ) method to disassociate the transaction from the resource. The resource manager can associate the global transaction to all work performed on its data between the start( ) and end( ) method invocation.

At transaction commit time, the transaction manager can inform the resource managers to prepare, commit, or rollback a transaction according to the two-phase commit protocol.

The foregoing description of preferred embodiments of the present invention has been provided for the purposes of illustration and description. It is not intended to be exhaustive or to limit the invention to the precise forms disclosed. Many modifications and variations will be apparent to one of ordinary skill in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for supporting a local transaction with an application view, comprising:
    a computer including one or more processors;
    an application view provided at the computer, wherein the application view switches from a stateless session bean to a stateful session bean, opening a connection from a client to an enterprise information system (EIS) for a local transaction, wherein the stateful session bean holds open the connection to the EIS across multiple requests in the local transaction, wherein the stateful session bean stores the connection to the EIS as state information, wherein the application view abstracts specific services and events of the EIS as a set of business functions, and wherein the application view is used by the client to manage the local transaction, thereby bypassing the use of a separate connection class by the client for processing local transactions; and
    a local transaction interface managing the local transaction at the EIS, for use with the application view; and wherein
    the local transaction functionality is not directly exposed, instead the functionality of the local transaction is provided on an application view interface, the application view providing method functions to support the use of local transactions, including the methods to begin, commit, roll-back, and update the state information for the local transaction, providing the client with local transaction functionality, wherein state is provided in an application view bean, and the application view bean retains a connection for the duration of a single transaction, wherein the application view bean is deployed as both the stateful session bean and the stateless session bean, the client managing which bean is used, and
    wherein the local transaction interface uses the state information to manage the local transaction at the EIS.

2. A system according to claim 1, further comprising:
    a Common Client Interface class through which the local transaction interface can be exposed to a resource adapter client.

3. A system according to claim 1, wherein:
    the application view is capable of opening a database connection for a local transaction.

4. A system according to claim 1, further comprising:
    a transaction manager adapted to obtain a resource for any connection open for a local transaction.

5. A system according to claim 1, wherein:
    the local transaction interface further contains a local transaction management contract.

6. A system according to claim 1, wherein:
    the local transaction interface further contains a local transaction management contract adapted to enable an application server to provide an infrastructure and run-time environment for management of the transaction.

7. A system according to claim 1, further comprising:
    a plug-in capable of performing a transaction method for the application view.

8. A system according to claim 1, further comprising:
    a plug-in capable of creating a new instance of the application view.

9. A system according to claim 1, further comprising:
    a plug-in capable of invoking a service within the local transaction.

10. A system according to claim 1, wherein:
    the application view is capable of opening a connection for a local transaction against a resource adapter.

11. A method for supporting a local transaction with an application view, comprising:
    opening a connection from a client to an Enterprise Information System (EIS) for a local transaction by switching an application view from a stateless session bean to a stateful session bean, the stateful session bean holding the connection to the EIS open across multiple requests in the local transaction, wherein the stateful session bean stores the connection to the EIS as state information, wherein the application view abstracts specific services and events of the EIS as a set of business functions, and wherein the application view is used by the client to manage the local transaction, thereby bypassing the use of a separate connection class by the client for processing local transactions; and enabling management of the local transaction in the EIS by using the application view through a local transaction interface;

wherein the local transaction functionality is not directly exposed, instead the functionality of the local transaction is provided on an application view interface, the application view providing a set of method functions to support the use of local transactions, including the methods to begin, commit, roll-back, and update the state information for the local transaction, thereby providing the client with local transaction functionality, wherein state is provided in an application view bean, and the application view bean retains a connection for the duration of a single transaction, wherein the application view bean is deployed as both the stateful session bean and the stateless session bean, the client managing which bean is used; and using the state information by the local transaction interface to manage the local transaction at the EIS.

12. A method according to claim 11, further comprising:
holding the connection open for the duration of the local transaction.

13. A method according to claim 11, further comprising:
exposing a local transaction interface to a resource adapter client.

14. A system for supporting a local transaction with an application view, comprising:

means for opening a connection from a client to an Enterprise Information System (EIS) for a local transaction by switching an application view from a stateless session bean to a stateful session bean, the stateful session bean holding the connection to the EIS open across multiple requests in the local transaction, wherein the stateful session bean stores the connection to the EIS as state information, wherein the application view abstracts specific services and events of the EIS as a set of business functions, and wherein the application view is used by the client to manage the local transaction, thereby bypassing the use of a separate connection class by the client for processing local transactions; and means for enabling management of the local transaction in the EIS by using the application view through a local transaction interface;

wherein the local transaction functionality is not directly exposed, instead the functionality of the local transaction is provided on an application view interface, the application view providing a set of method functions to support the use of local transactions, including the methods to begin, commit, roll-back, and update the state information for the local transaction, thereby providing the client with local transaction functionality, wherein state is provided in an application view bean, and the application view bean retains a connection for the duration of a single transaction, wherein the application view bean is deployed as both the stateful session bean and the stateless session bean, the client managing which bean is used; and means for using the state information by the local transaction interface to manage the local transaction at the EIS.

15. A computer-readable storage medium, comprising:
means for opening a connection from a client to an Enterprise Information System (EIS) for a local transaction by switching an application view from a stateless session bean to a stateful session bean, the stateful session bean holding the connection to the EIS open across multiple requests in the local transaction, wherein the stateful session bean stores the connection to the EIS as state information, wherein the application view abstracts specific services and events of the EIS as a set of business functions, and wherein the application view is used by the client to manage the local transaction, thereby bypassing the use of a separate connection class by the client for processing local transactions; and means for enabling management of the local transaction in the EIS by using the application view through a local transaction interface;

wherein the local transaction functionality is not directly exposed, instead the functionality of the local transaction is provided on an application view interface, the application view providing a set of method functions to support the use of local transactions, including the methods to begin, commit, roll-back, and update the state information for the local transaction, thereby providing the client with local transaction functionality, wherein state is provided in an application view bean, and the application view bean retains a connection for the duration of a single transaction, wherein the application view bean is deployed as both the stateful session bean and the stateless session bean, the client managing which bean is used; and means for using the state information by the local transaction interface to manage the local transaction at the EIS.

16. A computer program product for execution by a server computer for supporting a local transaction with an application view, comprising:

computer code for opening a connection from a client to an Enterprise Information System (EIS) for a local transaction by switching an application view from a stateless session bean to a stateful session bean, the stateful session bean holding the connection to the EIS open across multiple requests in the local transaction, wherein the stateful session bean stores the connection to the EIS as state information, wherein the application view abstracts specific services and events of the EIS as a set of business functions, and wherein the application view is used by the client to manage the local transaction, thereby bypassing the use of a separate connection class by the client for processing local transactions; and computer code for enabling management of the local transaction in the EIS by using the application view through a local transaction interface;

wherein the local transaction functionality is not directly exposed, instead the functionality of the local transaction is provided on an application view interface, the application view providing a set of method functions to support the use of local transactions, including the methods to begin, commit, roll-back, and update the state information for the local transaction, thereby providing the client with local transaction functionality, wherein state is provided in an application view bean, and the application view bean retains a connection for the duration of a single transaction, wherein the application view bean is deployed as both the stateful session bean and the stateless session bean, the client managing which bean is used; and computer code for using the state information by the local transaction interface to manage the local transaction at the EIS.

17. A computer system comprising: a processor;
object code executed by said processor, said object code configured to:
open a connection from a client to an Enterprise Information System (EIS) for a local transaction by switching an application view from a stateless session bean to a stateful session bean, the stateful session bean holding the connection to the EIS open across multiple requests in the local transaction, wherein the stateful session bean stores the connection to the EIS as state information, wherein the application view abstracts specific services and events of the EIS as a set of business functions, and wherein the application view is used by the client to manage the local transaction, thereby bypassing the use of a separate connection class by the client for processing local transactions; and enable management of the local transaction in the EIS by using the application view through a local transaction interface; and wherein the local transaction functionality is not directly exposed, instead the functionality of the local transaction is provided on an application view interface, the application view providing a set of method functions to support the use of local transactions, including the methods to begin, commit, roll-back, and update the state information for the local transaction, thereby providing the client with local transaction functionality, wherein state is provided in an application view bean, and the application view bean retains a connection for the duration of a single transaction, wherein the application view bean is deployed as both the stateful session bean and the stateless session bean, the client managing which bean is used; and use the state information by the local transaction interface to manage the local transaction at the EIS.

18. A computer-readable storage medium, comprising:
a code segment including instructions to open a connection from a client to an Enterprise Information System (EIS) for a local transaction by switching an application view from a stateless session bean to a stateful session bean, the stateful session bean holding the connection to the EIS open across multiple requests in the local transaction, wherein the stateful session bean stores the connection to the EIS as state information, wherein the application view abstracts specific services and events of the EIS as a set of business functions, and wherein the application view is used by the client to manage the local transaction, thereby bypassing the use of a separate connection class by the client for processing local transactions; and
a code segment including instructions to enable management of the local transaction in the EIS by using the application view through a local transaction interface;

wherein the local transaction functionality is not directly exposed, instead the functionality of the local transaction is provided on an application view interface, the application view providing a set of method functions to support the use of local transactions, including the methods to begin, commit, roll-back, and update the state information for the local transaction, thereby providing the client with local transaction functionality, wherein state is provided in an application view bean, and the application view bean retains a connection for the duration of a single transaction, wherein the application view bean is deployed as both the stateful session bean and the stateless session bean, the client managing which bean is used; and a code segment including instructions to use the state information by the local transaction interface to manage the local transaction at the EIS.

19. The method of claim 11, wherein:
multiple actions against an EIS for a local transaction are grouped together into a logical unit of work.

20. The method of claim 11, wherein:
a client manages whether the stateless or the stateful bean is used, the client accessing an application view that provides methods including begin ( ), commit ( ) and rollback ( ) for local transaction final use the stateful bean.

21. The system of claim 1, further comprising:
a process management component that invokes the application view, said process management component including an associated transaction,
wherein when the application view begin method is encountered, the transaction associated with the process management component is suspended, and
the transaction associated with the process management component is resumed when the application view commit or rollback method is executed.

22. The system of claim 1, further comprising:
a connector adapted to connect to the EIS, wherein said connector supports one of the following:
only local transactions with user-defined transaction demarcation; or
only local transactions with transparent and atomic transaction demarcation; or
only local transactions with no user-defined transaction demarcation.

* * * * *